United States Patent
Ward

(10) Patent No.: US 8,900,087 B2
(45) Date of Patent: Dec. 2, 2014

(54) MULTI-SPEED INLINE AUTOMATIC BICYCLE TRANSMISSION

(71) Applicant: Francis Daly Ward, Chicago, IL (US)

(72) Inventor: Francis Daly Ward, Chicago, IL (US)

(*) Notice: Subject to any disclaimer, the term of this patent is extended or adjusted under 35 U.S.C. 154(b) by 0 days.

(21) Appl. No.: 13/834,629

(22) Filed: Mar. 15, 2013

(65) Prior Publication Data

US 2014/0274545 A1 Sep. 18, 2014

(51) Int. Cl.
*F16H 3/44* (2006.01)
*B62M 11/18* (2006.01)

(52) U.S. Cl.
CPC .................................. *B62M 11/18* (2013.01)
USPC .......................................... 475/269; 475/330

(58) Field of Classification Search
CPC ...... B62M 11/04; B62M 11/14; B62M 11/16; B62M 17/00; B62K 2207/00; F16H 9/10; F16H 55/54
See application file for complete search history.

(56) References Cited

U.S. PATENT DOCUMENTS

| | | | |
|---|---|---|---|
| 3,492,892 A * | 2/1970 | Keizo et al. .................... | 475/259 |
| 3,592,081 A | 7/1971 | Schwerdhofer | |
| 3,696,690 A | 10/1972 | Schwerdhofer | |
| 3,701,292 A | 10/1972 | Schulz | |
| 3,769,848 A | 11/1973 | McGuire | |
| 4,229,997 A | 10/1980 | Schwerdhofer | |
| 4,727,965 A * | 3/1988 | Zach et al. .................. | 192/217.4 |
| 4,781,663 A | 11/1988 | Reswick | |
| 6,685,205 B1 | 2/2004 | Weaver | |
| 7,059,618 B2 | 6/2006 | Mallard | |
| 8,100,208 B2 * | 1/2012 | Jordan ........................ | 180/65.51 |
| 8,226,517 B2 * | 7/2012 | Tsai et al. ..................... | 475/149 |
| 8,512,182 B2 | 8/2013 | Tam | |
| 2007/0213150 A1 | 9/2007 | Chattin | |
| 2007/0275811 A1 * | 11/2007 | Starik ........................... | 475/259 |
| 2012/0329589 A1 | 12/2012 | Tam | |

FOREIGN PATENT DOCUMENTS

DE  EP0105949  12/1988

* cited by examiner

*Primary Examiner* — David D Le

(57) ABSTRACT

An inline automatic bicycle transmission, containing a planetary gear train, wherein gear selection is done by operation of a centrifugal governor. As the speed of the bicycle increases the transmission will automatically shift into a high gear ratio and the reverse occurs as the bicycle speed decreases.

10 Claims, 2 Drawing Sheets

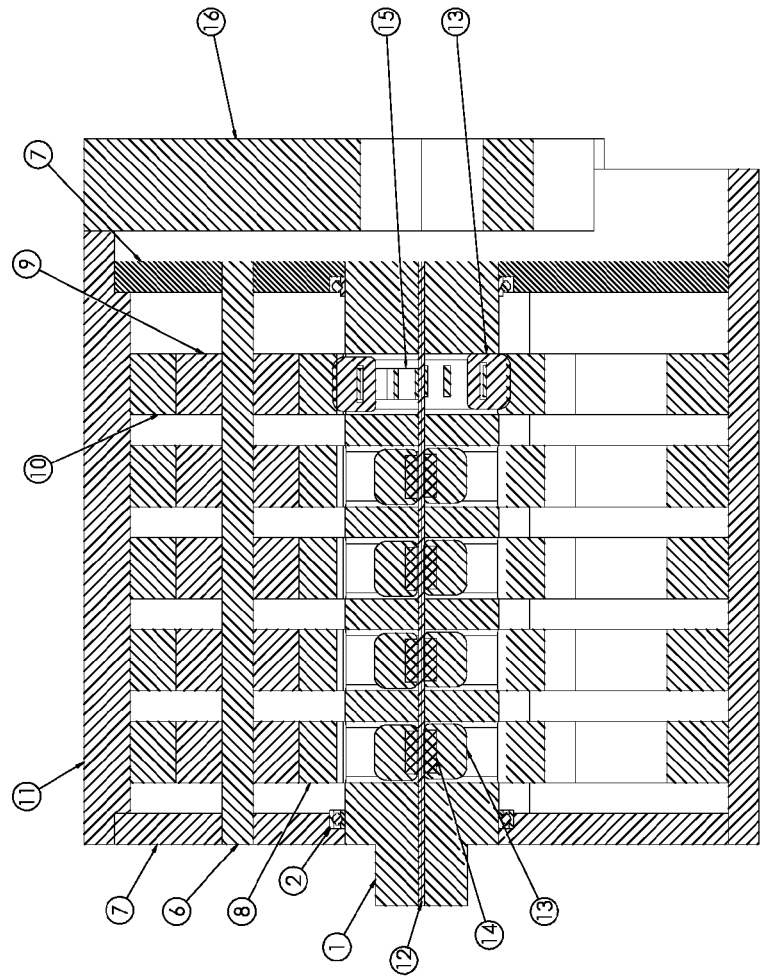
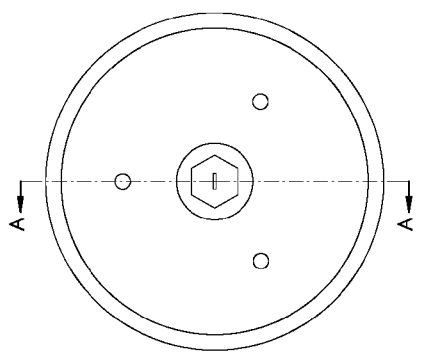
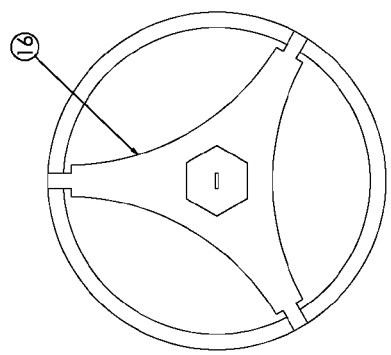
FIG. 1C
FIG. 1A
FIG. 1B

MULTI-SPEED INLINE AUTOMATIC BICYCLE TRANSMISSION

FIELD OF THE INVENTION

The present invention relates to an automatic transmission system designed for a bicycle or similar means of transportation. More particularly, this invention relates to a multi-speed bicycle transmission, the gear selection of which is controlled by means of a centrifugal governor.

BACKGROUND OF THE INVENTION

Currently many varying types of bicycle transmissions exist, from archaic single speeds to modern multi-speeds. In general, the types of transmissions can be categorized in three ways: manually shifted, automatic, or a hybrid manual-automatic.

Manual bicycle transmissions operate by means of a cable or lever, which when activated change the gear higher or lower, as desired by the cyclist. This relatively simple and older design allows for maximum control by the cyclist, however, it requires constant vigilance, to ensure that the transmission is in the optimal gear. Additionally, it can be cumbersome in cities where frequent stops and starts are required.

Subsequently, to alleviate these problems, a variety of automatic transmissions were designed. Starting from rest these designs engaged the lowest gear and upon acceleration of the bicycle to higher speeds, would automatically to the middle and then the highest gear. This automatic shifting obviated the need to select gears manually. As an additional feature some of the designs allowed for a hybrid manual-automatic shift control, by which the cyclist could manually select gears, if desired.

U.S. Pat. Nos. 4,229,997; 3,701,292; 3,69,690; and 3,592,081 disclose many of the early embodiments of automatic three speed hubs. In most, the automatic shifting feature is accomplished by mean of centrifugal weights, which shift gears as the speed of the bicycle increases.

In more recent years, new designs of transmission have become available. Currently three types are known to exist: fluid drive, centrifugal, and torque-responsive. Each design has particular benefits and limitations associated with it.

Fluid drive transmissions, commonly used in automobiles, utilize the drag of a fluid contained within the transmission to transfer power. An example of this applied in bicycles is U.S. Pat. No. 7,059,618, which describes a transmission that utilizes the principle of fluid drag to transfer power from the cyclist to the bicycle. It achieves this by means of a fluid filled chamber containing a stator assembly, which can alter the drag of the fluid between the inner and outer walls of the chamber. As the input torque increases, the stator vanes are forced away from the outer shell, thereby creating a larger clearance and more slippage between the fluid and the outer chamber wall. The increase in slippage effectively changes the mechanical advantage between the input and output torque, and, in the above situation, effectively acts as a "shift" into a lower gear. Correspondingly, if the input torque is reduced, the operation performs in reverse as a "shift" into a higher gear. Unfortunately, this system has several drawbacks. First, the system requires continuous input torque to operate effectively and, if the input torque is varied, could up-shift at an inopportune time, i.e. in the middle of a long hill. Secondly, the transmission would be difficult to maintain, as the entire assembly would need to be drained to access the mechanical components, in addition to other disassembly. Alternatively, the fluid could leak out during operation and render the bicycle useless, after only a small amount of fluid is lost. Finally, this system would require extensive retrofitting to be equipped on a standard bicycle.

The second category of automatic transmissions, torque responsive transmissions, come in variety of configuration, however all operate by selecting the gear ratio based on the input torque from the cyclist. There are two main types of torque responsive transmissions, v-belt pulley systems, such as U.S. Pat. No. 4,781,663, or a spiral and spring system, as described in U.S. Pat. No. 3,769,848 or application Ser. No. 13/165,807. The v-belt pulley systems operate by means of a v-belt connected to several pulleys, which are of variable size. As the input torque increases, the tension on the v-belt causes the pulleys to effectively change in size, by means specific to each embodiment, and thereby change the gear ratio. The main drawback of this invention, is that it requires a constant torque input or it will return to a "low torque, high speed" configuration. This means the transmission will have effectively up-shifted every time the cyclist pauses in or varies his rhythm. Several methods of "holding" the gear have been devised, but all require manual input from the rider to be activated. The second type of torque responsive transmissions uses a spiral and spring to select the appropriate gear. In lace of the v-belt and pulleys, these use a helical shaped or "spiral" shaft through which the input torque is transmitted to push a mechanism, specific to each embodiment, against a spring and as the spring is compressed, the transmission shifts gears. With this invention, the spring will be at maximum compression when the maximum input torque is applied and through varying means, the transmission will shift to the lowest gear ratio. As the input torque decreases, the spring will force the mechanism toward its zero input torque position and in so doing up-shift. These designs still suffer from a lack of gear "holding," and will up-shift without a continuous torque input, though an automatic "hold" device is described in U.S. App. U.S. 2012/0329589 A1. However, this "hold" device only activates when the rider is traveling uphill.

The third category of automatic transmissions are centrifugally governed. In general, these types of transmissions work by harnessing the rotational inertia of the bicycle wheels. This is achieved by having a particular component of the system rotate at a speed proportional to the bicycle wheels. The centrifugal force created by this is then used to induce the movement of the gear selection mechanism, and subsequently lead to a change in gear ratio. Two designs have evolved using this principle; automatic hear hubs and automatic transmissions within the multi-stage sprocket bracket assembly. The first type, automatic hubs, such as U.S. Pat. No. 4,229,997, are comprised of an epicyclical gear assembly, a plurality of centrifugal weights, and an overrunning clutch. The rotational motion of the bicycle wheels causes the weights to be forced away from the centerline of the hub and, upon reaching a given speed, the weights are far enough from the centerline to engage the gear set and thereby increase the gear ratio. Once the speed of the bicycle wheels surpasses the speed of the gear set, the overrunning clutch will disengage the gear set. Alternatively, if the bicycle wheel speed decreases the weights will, by use of springs, be pulled toward the centerline of the hub and disengage from the gear set. There are several distinct disadvantages with this type of automatic transmission. First, the entire assembly must be contained within the bicycle wheel hub, and is therefore constrained in size. This constraint has meant that all previous designs have been limited to no more than three speeds. Secondly, the assemblies and various mechanisms are complex and rely on many small pieces, making manufacture difficult and expensive.

The second type of centrifugal transmissions move the control system from the rear wheel hub to the either the front sprocket assembly or both the front and rear sprocket assemblies. An example of the latter is disclosed in U.S. Patent Application Publication No. US 2007/0213150 A1. In that patent application, a transmission system which comprises a rotatable shaft, a plurality of centrifugal weights pivotally connected to each other and to a star-shaped collar, a collar assembly that includes the above star-shaped collar and a rear derailleur is disclosed. The rotational motion of the bicycle wheels causes the centrifugal weights to rotate and as the rotational speed of the centrifugal weights increases, the increased centrifugal force causes the centrifugal weights to flare outward. As the centrifugal weights flare outward, the collar assembly is then forced to move along the rotatable shaft, and consequently the chain guide of the rear derailleur derails the drive chain from a larger diameter sprocket to an adjacent smaller diameter sprocket, thereby resulting in an "up-shift" to a higher gear ratio as the speed of the bicycle increases. As the bicycle speed decreases, the reverse occurs. However, this design and other similar to it, have some drawbacks. First, the system is complex and would require retrofitting any onto any conventional bicycle. Second, the designs still require the use of a chain and sprocket system, which are exposed during operation. This is not limited to the last type of automatic transmission, as, all of the above inventions require the use of chain and sprocket drive assemblies. Due to the lack of shielding, chain and sprockets are known to become tangled clothing, or are prone to oxidation through exposure to the elements. Further, the chains require frequent lubrication and are prone to stretching from normal use, which results in the need for more frequent maintenance.

Previously, attempts have been made to eliminate the chain and sprocket system using shafts. Earlier attempts simply replaced the chain and sprockets with a shaft, a disclosed in Publication EP 0105949 B1, which used a shaft to drive a multi-speed rear hub. A later design, disclosed in U.S. Pat. No. 6,685,205, utilized an inline transmission, in place of a rear hub. In the disclosed invention, the transmission is comprised of an input shaft, an output shaft and an epicyclical gear train. The input shaft is rotated by a bevel gear set located in the pedal assembly. The input shaft, in turn rotates the gear train, with the cyclist manually selecting the gear ratio. The gear train operates by using the input shaft to drive the sun gear, which in turn drives a plurality of planetary gears attached to an axle in sets. The axle is allowed to rotate freely. Each planetary gear set is surrounded by a free rotating ring gear. To select a certain gear ratio the cyclist, by means of a cable and shift key, fixes the ring gear, which forces the planetary gears to rotate the sun gear on the output shaft at the given gear ratio. The output shaft in turn rotates the rear wheel by means of a bevel gear set. This design, while eliminating the chain and sprocket, still has disadvantages. First, the transmission is not automatic and requires manual gear selection. Second, as the gear cannot "stretch" under load, when the transmission shifts gears the cyclist will be jarred.

Thus, there is still a need for a shaft driven automatic bicycle transmission, that has more than three gear ratios, is simple to manufacture, and requires no cyclist input, to select the optimum gear.

Therefore, it would be desirable to have a simple, inline, shaft driven automatic bicycle transmission, which is easy to manufacture and efficiently transmits power to the rear bicycle wheel, without cyclist input.

Therefore, it is an objective of this invention to provide an apparatus that overcomes the inadequacies of the prior art devices and provides an improvement that is a significant contribution to the advancement of automatic bicycle transmissions. Another object of this invention is to provide for a modular transmission, which may be modified to contain as many gear ratios as the cyclist desires.

SUMMARY OF THE INVENTION

For the purpose of summarizing this invention, this invention is an automatic transmission for a multi-speed bicycle employing an inline epicyclical gear train, which is selectively engaged by means of centrifugal force imparted to the transmission from the speed of the bicycle. Thus, the centrifugally operated transmission functions to automatically upshift the bicycle, as it speed increases. Then, as the speed of the bicycle decreases, a biasing spring or magnetic force, overcomes the centrifugal force and thereby causes the transmission to down shift.

More particularly, the multi-speed transmission includes an input sleeve and output shaft, with the epicyclical gear sets between them. The centrifugal force employed to engage a particular epicyclical gear set is generated by means of centrifugal weights, positioned inside the output shaft. Upon reaching a set speed, the weights engage the appropriate gear set by means of a one way clutch, fixedly attached to the sun gear. As the output shaft speed exceeds the speed of the sun gear, the clutch disengages the sun gear from the output shaft.

BRIEF DESCRIPTION OF THE DRAWINGS

FIG. 1A is a view of the output shaft side of the transmission;

FIG. 1B is a view of the input side of the transmission;

FIG. 1C is a sectional view of an epicyclical gear train taken along line A-A of FIG. 1A;

DETAILED DESCRIPTION OF THE PREFERRED EMBODIMENTS

Figure 2:
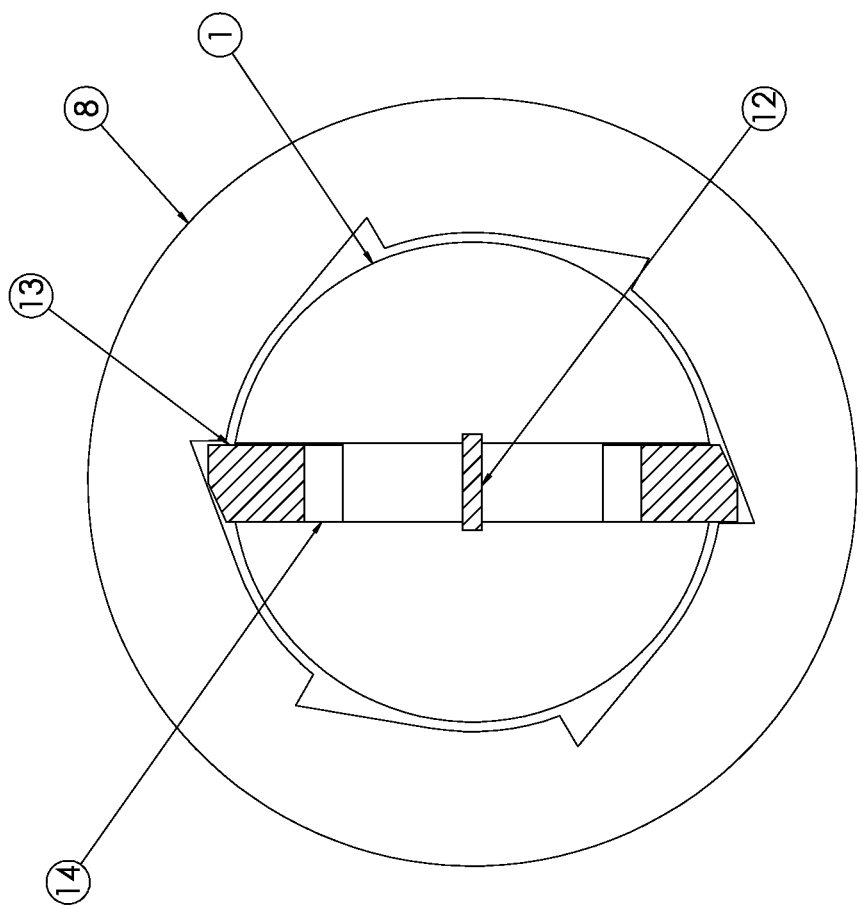
FIG. 2 is an isolated and enlarged view of the sun gear and one-way clutch mechanism.

A multi-speed inline automatic bicycle transmission according to a preferred embodiment of the present invention will now be described in detail with reference to FIGS. 1 through 2 of the accompanying drawings.

The bicycle transmission according to this invention includes an input cylinder 11, fixedly connected to an input shaft adapter 16, which defines an interior space for housing transmission components, as to be described in due course.

An epicyclical gear train is positioned within the input cylinder 11, and enables input rotational power to be delivered to the output shaft at a selected speed by distributing input torque across selected gear configurations. More particularly, the epicyclical gear train includes a plurality of planet gears 9 are mounted on the carrier axle 6, which are fixedly attached to an end plate 7. The end plates 7, are stationary and fixedly attached to the bike frame. The planet gears 9 surrounding a particular sun gear will be referred to as a "set" of planet gears, it being understood that an identical set of planet gears may be surrounding each sun gear 8. Each planet gear 9 is mounted on the carrier axle, so as to allow it spin freely during operation. All planet gears 9 in a set are meshed with a sun gear 8. Each planet gear 9 within a set have identical diameters and number of teeth, so as to provide a single gear ratio per set, with each set having a different gear ratio.

The epicyclical gear train includes, a plurality of ring gears 10 that are positioned inside the input cylinder and are fixedly attached to it by means of a bar and slot. Each ring gear 10, meshes with a planetary gear 9 set and rotates the planetary gears 9 at a speed proportional to the input cylinder 11 speed.

The epicyclical gear train includes, a sun gear 8 meshed with a planet gear 9 set. Each sun gear 8 is selectively attached to the output shaft 1, by means of a one-way clutch feature of each sun gear 8. The output shaft 1, is connected to the rear wheel of the bicycle and rotates at a speed proportional to it and is held in position by the endplates 7, while being allowed to spin by means of bearings 2. As the rotational speed of the output shaft 1 increases, the centrifugal weights 13 are forced away from the centerline of the output shaft 1. Until a predetermined speed is reached, the centrifugal weights 13 are attached to the control plate 12, by means of magnets 14. Upon reaching the predetermined speed, the centrifugal force overcomes the power of the magnet 14 and the weight 13 engages the one-way clutch feature of the sun gear 8 (FIG. 2). Therefore, the input rotational force is modified and then transferred to the output shaft 1, according to the selected gear ratio. Once the speed of the output shaft 1 has surpassed the speed of a particular sun gear 8, the one-way clutch feature disengages the sun gear 8 from the output shaft 1, by allowing it to overrun.

The above is true for all gears, expect for the lowest gear, which must be engaged when the output shaft speed is zero. Therefore, the first gear centrifugal weights 13 are pushed outwardly from the output shaft 8 centerline by means of a spring 15. During operation the lowest gear ratio sun gear 8 will be engaged when the output shaft speed 1 is zero.

It should be appreciated that other means of holding the centrifugal weights 13, to the output shaft 1 centerline may be suitable. Namely, the use of springs, electromagnetic force, or servo motors could be used to engage the one-way clutch feature, at the desired rotational speed.

In use, the multispeed bicycle transmission may be mounted to a bicycle frame in any way such that the endplates 7 are held stationary and the input cylinder 11 is engaged by the pedals and the output shaft 1 engages the rear wheel.

It is understood that while certain foreseeable forms of this invention have been illustrated and described, it is not limited thereto except insofar as such limitations are included in the following claims and foreseeable functional equivalents thereof.

Having thus described the invention, what is claimed as new and desired to be secured by Letters Patent is as follows:

1. A multi-speed automatic transmission for a bicycle, comprising:
    an input cylinder with at least one epicyclical gear set with automatic gear selection disposed within;
    wherein said epicyclical gear set includes:
    an output shaft being mounted collinearly with said input cylinder;
    at least one centrifugal weight being movably positioned within a passage in said output shaft;
    said centrifugal weight being connected to a control plate by at least one spring, with said spring having a first end and a second end, wherein said first end is fixedly connected to said centrifugal weight and said second end is fixedly connected to said control plate;
    said control plate being disposed within and fixedly connected to said output shaft, collinear to an output shaft centerline;
    a sun gear selectively attached to said output shaft by an integral one-way overrunning clutch feature, allowing said sun gear to rotate freely about said output shaft unless engaged by said centrifugal weight protruding from said passage, with said output shaft being of a smaller diameter than said sun gear;
    at least one end plate fixedly connected to a plurality of carrier axles;
    a plurality of planetary gears rotatably mounted to said carrier axles, with said planetary gears being in meshing engagement with said sun gear; and
    at least one ring gear positioned to mesh with said planetary gears for relative motion thereabout, with said ring gear being fixedly attached to said input cylinder.

2. The transmission assembly according to claim 1,
    wherein said input cylinder defines an upstream connection for inputting rotational force;
    said output shaft defines a downstream connection for outputting rotational force; and
    said endplate is held immobile.

3. The transmission assembly according to claim 1,
    wherein said input cylinder defines a downstream connection for outputting rotational force;
    said output shaft defines an upstream connection for inputting rotational force; and
    said endplate is held immobile.

4. The transmission assembly according to claim 1,
    wherein said input cylinder is held immobile;
    said output shaft defines a downstream connection for outputting rotational force; and
    said end plate defines an upstream connection for inputting rotational force.

5. The transmission assembly according to claim 1,
    wherein said input cylinder is held immobile;
    said output shaft defines an upstream connection for inputting rotational force; and
    said end plate defines a downstream connection for outputting rotational force.

6. A multi-speed automatic transmission for a bicycle, comprising:
    an input cylinder, with at least one epicyclical gear set with automatic gear selection disposed within;
    wherein said epicyclical gear set includes:
    an output shaft being mounted collinearly with said input cylinder;
    at least one centrifugal weight being movably positioned inside said output shaft;
    at least one magnet fixedly attached to said centrifugal weight; and
    at least one control plate, disposed within said output shaft, collinear to an output shaft centerline;
    a sun gear selectively attached to said output shaft by an integral one-way overrunning clutch feature, allowing said sun gear to rotate freely about said output shaft unless engaged by said centrifugal weight;
    at least one end plate fixedly connected to a plurality of carrier axles;
    a plurality of planetary gears rotatably mounted to said carrier axles, said planetary gears being in meshing engagement with said sun gear; and
    at least one ring gear positioned to mesh with said planetary gears for relative motion thereabout, with said ring gear being fixedly attached to said input cylinder.

7. The transmission assembly according to claim 6,
    wherein said input cylinder defines an upstream connection for inputting rotational force;
    said output shaft defines a downstream connection for outputting rotational force; and
    said endplate is held immobile.

8. The transmission assembly according to claim 6,
wherein said input cylinder defines a downstream connection for outputting rotational force;
said output shaft defines an upstream connection for inputting rotational force; and
said endplate is held immobile.

9. The transmission assembly according to claim 6,
wherein said input cylinder is held immobile;
said output shaft defines a downstream connection for outputting rotational force; and
said end plate defines an upstream connection for inputting rotational force.

10. The transmission assembly according to claim 6,
wherein said input cylinder is held immobile;
said output shaft defines an upstream connection for inputting rotational force; and
said end plate defines a downstream connection for outputting rotational force.

* * * * *